United States Patent [19]

Bruce, Jr. et al.

[11] 4,344,133
[45] Aug. 10, 1982

[54] METHOD FOR SYNCHRONIZING HARDWARE AND SOFTWARE

[75] Inventors: William C. Bruce, Jr.; Fuad H. Musa; Terry F. Ritter, all of Austin, Tex.

[73] Assignee: Motorola, Inc., Schaumburg, Ill.

[21] Appl. No.: 140,336

[22] Filed: Apr. 14, 1980

Related U.S. Application Data

[63] Continuation of Ser. No. 929,628, Jul. 31, 1978, which is a continuation-in-part of Ser. No. 872,857, Jan. 27, 1978.

[51] Int. Cl.³ .............................................. G06F 9/46
[52] U.S. Cl. ................................................ 364/200
[58] Field of Search ... 364/200 MS File, 900 MS File

[56] References Cited

U.S. PATENT DOCUMENTS 4,003,028  1/1977  Bennett et al. ..................... 364/200
4,004,283  1/1977  Bennett et al. ..................... 364/200

Primary Examiner—Raulfe B. Zache
Attorney, Agent, or Firm—Joe E. Barbee

[57] ABSTRACT

A digital processor capable of responding to a sync instruction for high-speed synchronization of hardware and software is provided. The sync instruction places the procesor in a stopped state and lets the processor start up again only upon receipt of an interrupt. If the interrupt is disabled by being masked, the stopped state is simply cleared and the sequencing of instructions continues without vectoring to the interrupt service routine. However if the interrupt is not disabled, the processor will handle the interrupt just as it would if it were not in the stopped state. Upon return from the interrupt service routine, the stopped state is cleared and the sequencing of instructions continues. In this way, the sync instruction provides a mechanism for synchronizing software with hardware external to the processor without the delays associated with interrupts or busy-wait loops.

6 Claims, 3 Drawing Figures

METHOD FOR SYNCHRONIZING HARDWARE AND SOFTWARE

This is a continuation, of application Ser. No. 929,628, filed July 31, 1978 which is a continuation-in-part of application Ser. No. 872,857 filed on Jan. 27, 1978 and assigned to the same assignee as the present application.

This invention relates, in general, to digital processors, and more particularly, to a method of providing synchronization between hardware and software in a digital processing system.

The use of microprocessors has proliferated in recent years partly due to the ability of designers of such to produce flexible, easy to use systems which are usable both in traditional data processing environments and as replacements for random logic systems. With the proliferation of devices, it has become desirable to provide more flexible and easy to use microprocessors to aid systems designers in incorporating the devices into larger systems. High data rates are also desirable in some applications, and increase throughput, with easy to use devices in a continuing design goal. One way to achieve high data rates is to operate on larger pieces of data in parallel.

It is often desirable in high data rate processors to be able to synchronize software with an external hardware process. In the past this has been done in some systems by a polling loop or wait instruction which stores all the programmable registers on a stack. Once the registers were stacked the processor waited for an interrupt input from the external hardware to occur, and in response to the interrupt would vector to some interrupt address. Yet other systems of the prior art only had the capability of going to a limited number of addresses, in response to the interrupt, without the capability of being able to vector to any address. In a preferred system it would be desirable to be able to either vector to an address or to continue execution of an operating program.

Accordingly, it is an object of the present invention to provide a method for synchronization between hardware and software by placing a processor in a stopped state and then being able to vector to an interrupt address or to continue normal program execution.

BRIEF SUMMARY OF THE INVENTION

In carrying out the above and other objects of the invention in one form, there is provided a method for synchronization between hardware and software in a digital processor. A sync instruction is used to place the processor in a stopped state waiting for an interrupt to occur. The sync instruction causes a sync latch to be set. In other words, the sync latch is set to a predetermined state. Once the interrupt occurs the sync latch is reset, and if the interrupt is not masked, preselected programmable registers of the processor can be stacked and an interrupt address is vectored to. If the interrupt is masked the latch gets reset and the processor simply continues with the sequencing of instructions without servicing the interrupt. The sync is used to provide software synchronization with an external hardware process.

DESCRIPTION OF A PREFERRED EMBODIMENT

Figure 1:
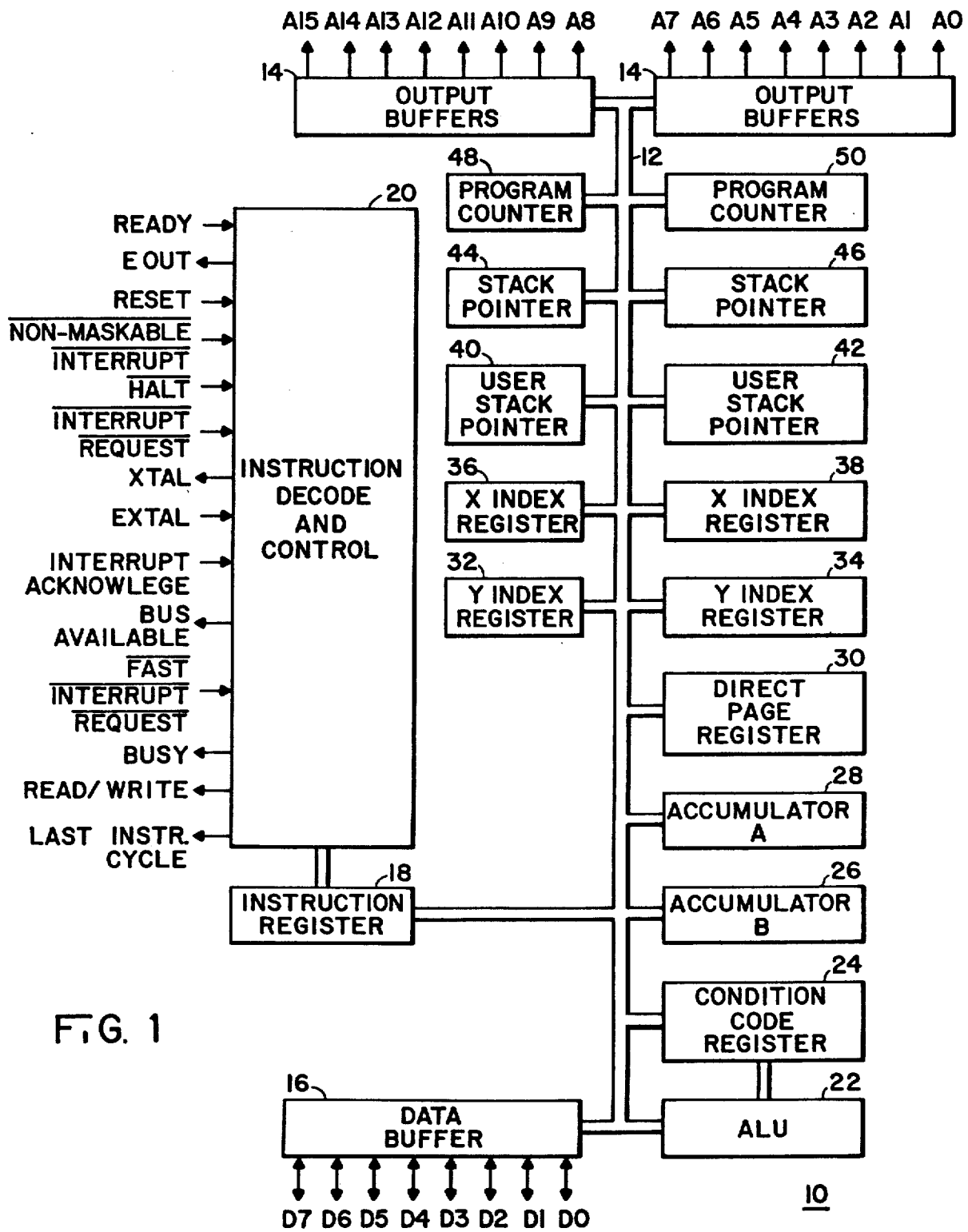
FIG. 1 shows a block diagram of a processor capable of carrying out the present invention.

FIG. 1 shows a microprocessor device 10 having a bus 12 for carrying address information or data. Connected to the bus 12 are output buffers 14 which are used to buffer addresses to provide addresses for memory or peripheral devices, not shown, external to the processor itself. Also connected to bus 12 is a data buffer 16 which is 8-bits wide in a preferred embodiment and the function of which is to buffer data from the internal bus 12 to devices external to the microprocessor on the eight lines D0–D7 as shown. The data buffer lines are bidirectional so that data can be transmitted or received through the same data buffering unit 16.

When instructions are received from an external device they are buffered by data buffer 16 and applied to an instruction register 18 and the instructions are decoded by an instruction decoder 20 which also provides and receives control signals. The internal control signals of the device 10 are not shown for clarity of description. Also connected to bus 12 are an arithmetic and logic unit 22 having a condition code register 24 associated therewith. Two accumulators 26 and 28 are provided connected to the bus 12 and arranged such that the two accumulators, which in a preferred embodiment are 8-bits each, may form a 16-bit accumulator which is referred to as accumulator D. The bus also has associated with it a direct page register 30, which is also an 8-bit register. A Y index register has a high 8-bit segment 32 and a low 8-bit segment 34 connected to the bus 12 to form a 16-bit Y index register. Similarly, an X index register has a high 8-bit segment 36 and a low 8-bit segment 38 to form a second 16-bit index register. Two stack pointers are provided each having high and low order segments, the user stack pointer having a high 8-bit segment 40 and a low 8-bit segment 42. A hardware stack pointer has a high 8-bit segment 44 and a low 8-bit segment 46 to provide a 16-bit hardware stack pointer; and a program counter has a high 8-bit segment 48 and a low 8-bit segment 50 to provide 16-bits of address which may be applied through output buffers 14 to provide a 16-bit address to devices external to the microprocessor 10.

A plurality of control signals are provided to the instruction decode and control unit 20 including a ready signal, an E (clock) signal which allows the clock of the device 10 to be provided to external system elements for synchronization. A reset pin is provided to initialize device 10 and two interrupt lines provide an interrupt request, and a nonmaskable interrupt to the control unit 20. A halt pin is provided for halting the operation of the machine upon external control. Two terminals are provided for connection to a crystal (XTAL and EXTAL). Interrupt acknowledge and bus available signals are also provided to and from the control device 20 as shown in the Figure. A third interrupt signal $\overline{\text{FIRQ}}$ (fast interrupt request) is provided to perform specialized interrupts as will be discussed later. A busy signal is provided from the control device 20 to allow utilization of device 10 in a multiprocessing environment. A read/write signal is provided to direct the reading or writing of data to or from a device external to the device 10. Another signal, last instruction cycle, is provided to indicate to external hardware that the subsequent data on the data bus is a machine operation code. Two other connections to device 10 are not specifically shown but are $V_{DD}$ and $V_{SS}$, the power supply pins, which in a preferred embodiment may be +5 and 0 volts.

It can be seen that the register arrangement of device 10 utilizes a plurality of 16-bit registers as described, and these 16-bit registers allow the performance of operations on 16-bits of data in parallel. The 8-bit registers including the accumulators are used for routine computation and byte-oriented data manipulations, such as editing, interpreting, compiling, and so on, and have the advantage of providing efficient byte-oriented operations which may be more difficult to handle if all registers in the system were 16-bits wide.

As previously noted, the two 8-bit accumulators can be used to form one 16-bit accumulator for double byte operations, thus giving the flexibility of being easily available for either 8-bit or 16-bit operation.

All registers associated with memory-referenced operations (the X and Y index registers, the user and hardware stack pointers) are all 16-bits wide.

Digital processor device 10, because of the register arrangement and other internal features, may perform long relative branches, program-counter relative addressing, and indirection. There is a provision for automatic increment or decrement by one or two to provide easy access to tabular data or to data buffers.

Some of the 16-bit instructions manipulate data in the two accumulators and other manipulate addresses in the index registers or stack pointers.

The "load effective address" instruction allows a programmer to add immediate values or an accumulator to an index register.

A plurality of long branch instructions are described, which are capable of reaching any location in memory. Several high-speed instructions which push or pull a selectable set of registers are provided which facilitate argument passage to and from subroutines, for example, and allow subroutines to save sets of registers at invocation and restore the same set before exit.

The transfer and exchange instructions give processor 10 flexibility and consistency by allowing any register to be transferred or to be exchanged with any like sized register.

The device also includes an unsigned 8-bit by 8-bit multiply with a 16-bit product. The multiply is unsigned to facilitate the generation of multiprecision products. In addition to its use for numerical calculations, the multiply function is useful in calculating array subscripts for programs written in high-level languages.

The auto increment and auto decrement instructions allow data movement and block comparisons in conjunction with memory reference instructions. A SYNC instruction is provided for high-speed synchronization of hardware and software. By stopping the processor and allowing it to start only when an interrupt line is activated or pulled low, the instruction provides a mechanism for synchronizing software with hardware external to processor 10 without the delays associated with interrupts or busy-wait loops. The method of synchronizing software and hardware will be explained in greater detail hereinafter.

Among the control signals, the ready input signal is provided for slow memory and multiprocessor management. Additionally, a busy signal is made available during read-modify-write operations for disabling other processors in multiprocessing systems. This busy signal, which allows system hardware exclusion from the start of the read cycle through the associated write interval, assures that updated data will be processed throughout the system.

The maskable fast interrupt pin on processor 10 generates a fast interrupt response for special priority interrupts. This interrupt ($\overline{FIRQ}$) causes the stacking of only the return addresses and condition code. Using only one instruction, a designer may stack all additional registers that must be protected. Moreover, an acknowledgement signal is available during any vector-fetch so that the interrupting device may directly specify the starting address of the associated interrupt handling routine.

Figure 2:
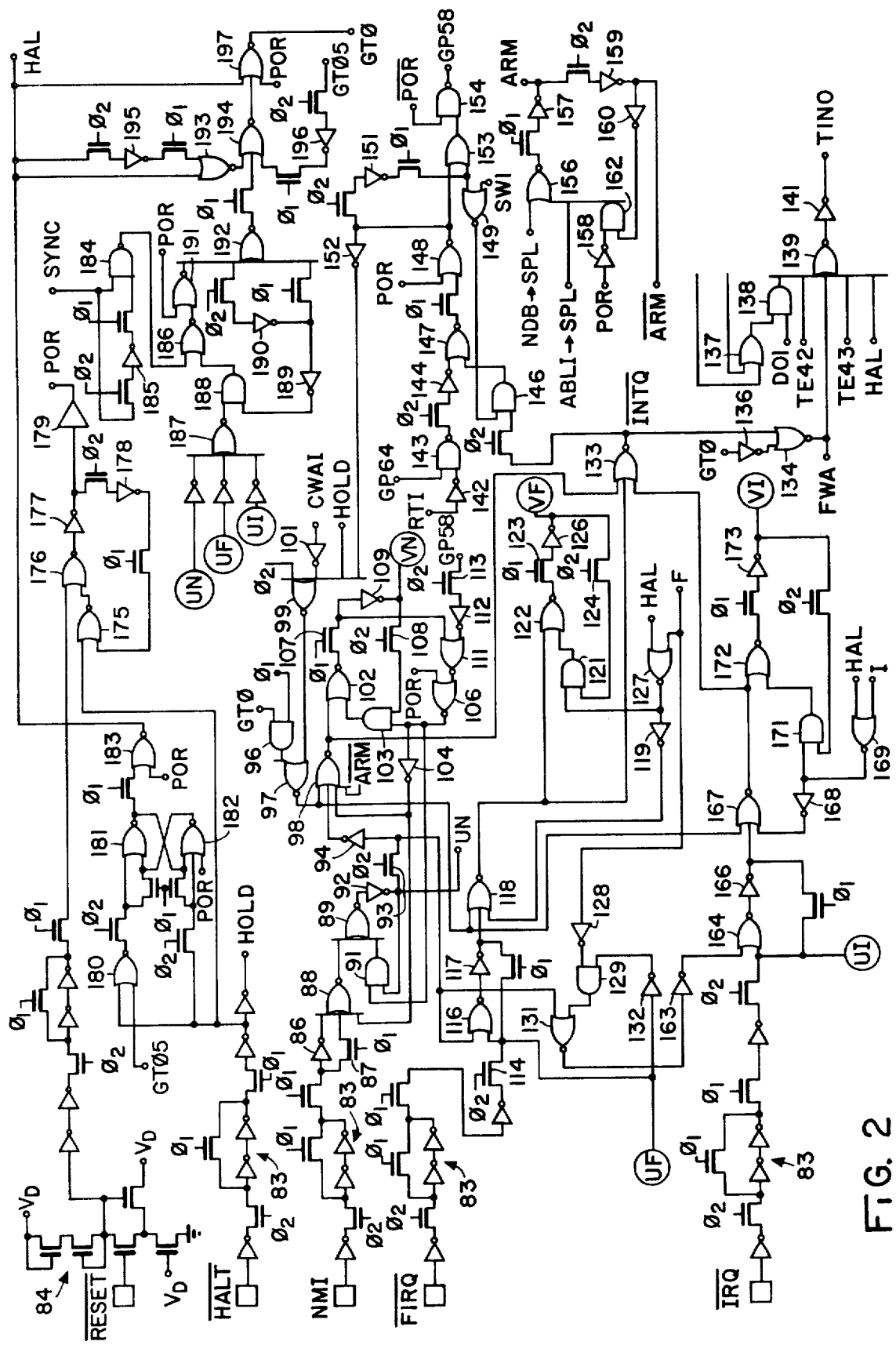
FIG. 2 illustrates a logic diagram a portion of the processor shown in FIG. 1 useful in understanding the present invention.

In FIG. 2, five of the interface pins for processor 10 are shown. These five interface pins receive input signals reset ($\overline{RESET}$), halt ($\overline{HALT}$), non-maskable interrupt (NMI), fast interrupt request ($\overline{FIRQ}$), and interrupt request ($\overline{IRQ}$) and all are zero active or in other words the complements of the signals are received. The reset input comes into a series of field effect transistors 84 which serves to reduce the effects of transients that may accompany the signal. The reset signal is coupled from field effect transistors 84 by two inverters and a gated field effect transistor into a synchronizing latch. The output of the synchronizing latch is coupled to a capture circuit formed by NOR gates 175, 176 and inverters 177, 178. The output of the capture circuit is amplified by amplifier 179 and is then called power on reset (POR). POR is used throughout processor 10 to perform reset functions.

Halt, non-maskable interrupt, fast interrupt, and interrupt request all are passed through synchronization circuits 83 before being used by processor 10. Each synchronization circuit 83 includes two series inverters having the output connected back to the input by a field effect transistor which is gated or enabled by phase 1 ($\phi1$) of the clock signal for processor 10. Other field effect transistors couple the input and the output of the latches and are enabled by both phase 1 ($\phi1$) and phase 2 ($\phi2$) of the clock cycle for processor 10.

An output from the halt synchronization circuit 83 is coupled to NOR gate 175 so that the capture circuit can capture a reset signal during halt. If a reset should occur during the presence of a halt signal the capture circuit serves to capture the reset signal so that the reset can be performed upon removal of the halt signal. The output of the halt synchronization circuit 83 is also coupled to an input of NOR gate 180. Also coupled to an input of NOR gate 180 is a signal, GT$\phi$5, indicating that the last cycle of an instruction has been performed. The output of NOR gate 180 is coupled by a field effect transistor, which is enabled by phase 2 of the clock cycle, into one of the inputs of NOR gate 181. NOR gate 181 is interconnected with NOR gate 182 to form a flip-flop latch. One of the inputs for NOR gate 182 is power on reset, POR. The output of NOR gate 181 is coupled to another of the inputs of NOR gate 182 and also coupled to an input of NOR gate 183. A second input of NOR gate 183 is power on reset. The output of NOR gate 183 is coupled to a first input of NOR gate 193 and to a second input of NOR gate 193 by inverter 195 and two transistors enabled by $\phi1$ and $\phi2$. The output of NOR gate 193 is connected to an input of NOR gate 194. The output of NOR gate 194 serves as an input for NOR gate 197. In addition, NOR gate 197 has as an input power on reset and also the output of NOR gate 183. The output of NOR gate 197 serves as a signal (GTφ) to indicate the beginning of an op code fetch cycle. An input for NOR gate 194 is the signal (GTφ5), indicating the last cycle of an instruction, and is coupled by inverter 196 and two gated transistors. A third input to NOR gate 194 is coupled by a transistor from NOR gate 192. One input of NOR gate 192 comes directly from NOR gate 191 while the other input is coupled from gate 191 through two field effect transistors and inverter 190. Power on reset is one input for NOR gate 191 while the other input comes from NOR gate 186. NOR gate 186 receives an input from AND gate 184. AND gate 184 receives a SYNC instruction input on one input, and the other input receives an inverted SYNC input which is coupled through inverter 185 and two field effect transistors. A second input for NOR gate 186 comes from AND gate 188. One input of AND gate 188 is coupled from the output of NOR gate 191 by one field effect transistor and two inverters 189, 190. A second input for AND gate 188 comes from NOR gate 187 which has three inputs UN, UF, and UI which are coupled by inverters and indicate that an interrupt has been received. These inputs (UN, UF, UI) are unmasked interrupts NMI, FIRQ, and IRQ which are coupled into NOR gate 187 before being prioritized. AND gate 188, NOR gates 186, 191, and inverters 189, 190 form a sync latch circuit. Inputs UN, UF, and UI serve to remove a SYNC instruction input by resetting the sync latch. The purpose of this feature will become more apparent hereinafter.

The non-maskable interrupt signal, NMI, is coupled by its synchronization circuit 83 into an inverter 86 whose output is connected to an input of NOR gate 88. A second input of NOR gate 88 is the output from synchronization circuit 83 coupled by field effect transistor 87. The purpose of inverter 86 and NOR gate 88 is to form an edge detector circuit to generate a pulse from the non-maskable interrupt signal. The output of NOR gate 88 is coupled to an input of NOR gate 89. The output of NOR gate 89 is coupled by inverter 92 to an input of AND gate 91. The output of AND gate 91 serves as a second input for NOR gate 89. The output of inverter 92 is also coupled by field effect transistor 93 to an input of NOR gates 116, 131, to inverter 94, and is coupled by an inverter to an input of NOR gate 187. The output of inverter 94 goes to an input of NOR gate 98. Another input for NOR gate 98 comes from NOR gate 97. One input for NOR gate 97 comes from AND gate 96 which has two inputs, phase 1 clock input and the output, GTφ, from NOR gate 197. A second input for NOR gate 97 comes from NOR gate 99. NOR gate 99 has as an input phase 2 clock signal, clear wait signal (CWAI) coupled by inverter 101, an inverted halt signal (HOLD), and the output from inverter 152.

Now another input to NOR gate 98 is from inverter 104. NOR gate 98 also receives an input ($\overline{ARM}$) from inverter 159 which serves to inhibit NOR gate 98 following reset and prior to the stack being loaded. The output of NOR gate 98 goes to NOR gate 133 and to NOR gate 102. Nor gate 102 also receives an input from AND gate 103. The output from NOR gate 102 is coupled by field effect transistor 107, inverter 109, and field effect transistor 108 to an input of AND gate 103. A second input for AND gate 103 comes from NOR gate 106. The output, VN, from inverter 109 serves as the vector request latch output, VN, for the non-maskable interrupt. An input signal, GP58, indicating that processor 10 is processing an instruction is coupled into inverter 112 by field effect transistor 113. The input to inverter 112 serves to reset the NMI latch formed by NOR gate 102, AND gate 103, and inverter 109. This input signal thereby prevents a non-maskable interrupt from occurring in the middle of an instruction cycle. The output of inverter 112 goes to an input of NOR gate 111. A second input for NOR gate 111 comes from the output of NOR gate 102 which is coupled by field effect transistor 107. The output of NOR gate 111 goes to an input of NOR gate 106, and power on reset, POR, serves as a second input for NOR gate 106.

A fast interrupt request ($\overline{FIRQ}$) is coupled by synchronization circuit 83 and field effect transistor 114 into a first input of NOR gate 116. This input serves as the unmasked fast interrupt input, UF, and is coupled by inverter 132 to an input of AND gate 129, and is also used as an input to NOR gate 187. The input that goes to NOR gate 187 is coupled by an inverter and serves to reset the sync latch when a fast interrupt request is received. The output of NOR gate 116 is coupled by inverter 117 and by a field effect transistor, which is gated on by phase 1 of the clock signal, back into the first input of NOR gate 116. The output of inverter 117 also goes to an input of inverter 118. NOR gate 118 also receives inputs from NOR gate 97 and from inverter 119. The output of NOR gate 118 goes to an input of NOR gate 122, and a second input for gate 122 comes from AND gate 121. The output of gate 122 is coupled by field effect transistor 123, inverter 126, and field effect transistor 124 to an input of AND gate 121. Field effect transistor 123 is enabled by phase 1 of the clock cycle while field effect transistor 124 is enabled by phase 2 of the clock cycle. AND gate 121, NOR gate 122, transistors 123, 124, and inverter 126 serve as a fast interrupt vector request latch and provide output VF. The mask bit, F, for the fast interrupt request from condition code register 24 (FIG. 1) serves as an input to NOR gate 127 and to inverter 128. A second input for NOR gate 127 is the halt signal, HAL. The output of NOR gate 127 goes to an input of AND gate 121 and to inverter 119. The output of inverter 119 serves as an input for NOR gate 118. The output of inverter 128 goes to an input of AND gate 129 and a second input to AND gate 129 is coupled by inverter 132 and field effect transistor 114 from synchronization circuit 83. A second input for NOR gate 131 comes from the priority circuit for the non-maskable interrupt request. The output of NOR gate 131 is coupled by inverter 163 to an input of NOR gate 164 and serves to inhibit an interrupt request ($\overline{IRQ}$) when a non-maskable interrupt ($\overline{NMI}$) or a fast interrupt request ($\overline{FIRQ}$) is present.

An interrupt request input ($\overline{IRQ}$) is coupled by synchronization circuit 83 into an input of NOR gate 164. The output of NOR gate 164 is inverted by inverter 166 and coupled by a field effect transistor, enabled by phase 1 of the clock signal, back into an input of NOR gate 164. This input to NOR gate 164 also is coupled to an input of NOR gate 187 to terminate a sync instruction once an interrupt request (IRQ) is received. The output of inverter 166 also goes to NOR gate 167. A second input for NOR gate 167 comes from NOR gate 97. The output of NOR gate 167 goes to an input of NOR gate 172 and to an input of NOR gate 133. The output of NOR gate 172 is coupled by a field effect transistor, enabled by phase 1 of the clock signal, and by inverter 173 to form output VI. Logic gates 171, 172, the two field effect transistors, and inverter 173 serve the function of a vector request latch for the interrupt request input. The output of inverter 173 is also coupled by a field effect transistor, enabled by phase 2 of the clock signal, to an input of AND gate 171. The output of AND gate 171 serves as a second input for NOR gate 172. A second input for AND gate 171 comes from NOR gate 169. NOR gate 169 receives the halt input, HAL, and also receives an input, I, from condition code register 24 (of FIG. 1) indicating whether the interrupt request is masked or not. The output of NOR 169 also goes to an input of inverter 168 whose output serves as an input for NOR gate 167. NOR gates 98, 118, and 167 provide inputs to NOR gate 133. The output, $\overline{INTQ}$, of NOR gate 133 indicates whether an interrupt has been received by processor 10.

An output of NOR gate 133 is used as an input for NOR gate 134. An output, GTφ, from NOR gate 197 is also coupled by inverter 136 as an input for NOR gate 134. The output of NOR gate 134 serves as an op code to force-a-wait (FWA). FWA is generated whenever an unmasked interrupt occurs provided that preceding the interrupt a clear-and-wait instruction (CWAI) has not placed the processor in a stopped state waiting for an interrupt. The FWA is used to tell processor 10 not to fetch the next op code from ROM but instead to generate a new op code in the processor itself.

The output of NOR gate 133 is also coupled by a field effect transistor to an input of AND gate 146. The output of AND gate 146 serves as an input for NOR gate 147. NOR gate 147 also receives an input from NAND gate 143 which is coupled by a field effect transistor and inverter 144. NAND gate 143 has an input, GP64, indicating the end of an instruction, and also has an input coupled by inverter 142 which indicates a return from interrupt instruction (RTI). The output of NOR gate 147 is coupled by a field effect transistor to an input of NOR gate 148. A second input for gate 148 is power on reset (POR). The output of NOR gate 148 goes to inverter 152, a first input of OR gate 153, and is coupled by a field effect transistor enabled by phase 2 of the clock signal and inverter 151 and by a second field effect transistor enabled by phase 1 of the clock signal to a second input of OR gate 153. The output of OR gate 153 serves as an input for NAND gate 154. The second input of OR gate 153 also serves as an input for NOR gate 149. NOR gate 149 has a second input which is software interrupt (SWI). A second input for NAND gate 154 is $\overline{POR}$. The output, GP58, of NAND gate 154 indicates a particular cycle time of an instruction and is coupled to inverter 112 by field effect transistor 113. The output of NOR gate 149 goes to an input of AND gate 146. Logic gates 146, 147, 148, 149 along with inverter 151 and three field effect transistors form a latch for latching a clear-and-wait instruction (CWAI).

NOR gate 156, inverters 157, 159, 160, 158, and AND gate 162 form a non-maskable interrupt arm latch. NOR gate 156 receives two inputs indicating that the stack has been loaded, and inverter 158 couples POR to an input of AND gate 162.

Figure 3:
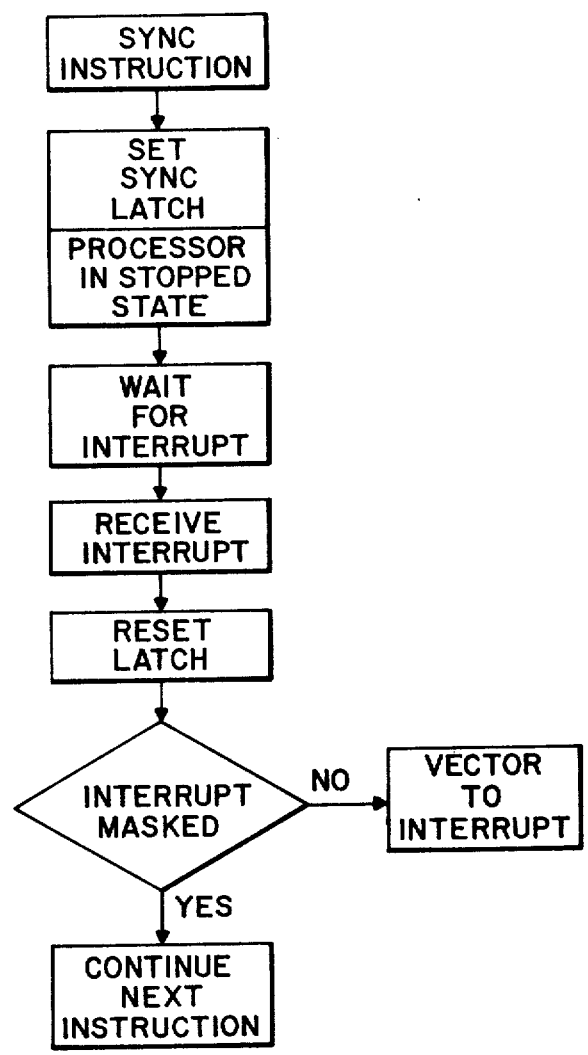
FIG. 3 illustrates in simplified block diagram form a method of practicing the present invention.

The method outlined in FIG. 3 shows a sync instruction being responded to. This sync instruction places the processor in a stopped state and sets the sync latch illustrated in FIG. 2. During the time that the sync latch is set the processor waits to receive an interrupt. The interrupt will be generated by some external hardware such as a peripheral device. Upon receipt of the interrupt the sync latch is reset, as shown in FIG. 2, by signals UN, UF, and UI which are coupled to the input of NOR gate 188. It should be noted that the interrupt input signals used to reset the sync latch are obtained prior to reaching the interrupt vector request latches. It should be noted that if an interrupt is masked then the vector request latches will not be set by the interrupt signal, however, the interrupt signal still comes into the front end of the synchronization and priority circuitry illustrated in FIG. 2.

If the interrupt received is enabled, the processor will handle the interrupt just as it would if it were not in the stopped state. Upon return from the interrupt service routine, the stopped state has been cleared and the sequencing of instructions continues. On the other hand, if the interrupt is disabled by being masked, the stopped state is simply cleared and the sequencing of instructions continues without vectoring to the interrupt service routine. As an example, consider the following loop for reading a byte of data into an array from a peripheral device each time the peripheral device sends an interrupt signal to the processor when that particular interrupt is masked:

| FAST | SYNC | | Wait for Interrupt |
|---|---|---|---|
| | | -INTERRUPT- | |
| | LDA | ,X | Get data from input port |
| | STA | ,Y+ | Store data and increment address |
| | DECB | | Are we done? |
| | BNE | FAST | If not, do it again |

The sync instruction provides for high-speed synchronization of hardware and software. It stops the processor and lets it start up again only when one of the interrupt lines is pulled low which indicates an interrupt signal. In this way, the instruction provides a mechanism for synchronizing software with hardware external to the processor without the delays associated with interrupts or busy-wait loops. It should be noted that the sync instruction does not cause the processor to stack any of the programmable registers. Therefore time is not wasted stacking registers when it is not desired to stack the registers. The present invention allows the processor to continue from a stopped state when a masked interrupt is received. The non-maskable interrupt, NMI, will be serviced by the processor even if it is in a syncing state and in most cases will only be used in response to an emergency condition.

By now it should be appreciated that there has been provided a digital processor capable of high speed synchronization between hardware and software. When a sync instruction is executed, the processor enters a syncing state, stops processing instructions, and waits on an interrupt. When an interrupt occurs, the syncing state is cleared and processing continues. If and only if the interrupt is enabled, the processor will perform the interrupt routine. If the interrupt is masked, the processor simply continues to the next instruction without stacking any registers.

What is claimed is:

1. A method of providing high-speed synchronization between hardware and software in a digital processing system, comprising: performing a sync instruction to cause the digital processing system to assume a stopped state; waiting for an interrupt to occur; receiving an interrupt; and vectoring to an interrupt address to service the interrupt or fetching an op code which is next in sequence when the interrupt received is masked.

2. A method of synchronizing hardware and software in a digital system having a central processing unit and at least one peripheral device, comprising: stopping the central processing unit and waiting for an interrupt; and deciding whether to vector to an address for the interrupt or whether to fetch a next in sequence op code.

3. The method of claim 2 wherein the next in sequence op code is fetched when the interrupt received is masked.

4. A method of providing synchronization between hardware and software in a digital system having a central processing unit and at least one peripheral device, comprising: placing the central processing unit in a stopped state; waiting for an interrupt to occur; receiving the interrupt; clearing the stopped state of the central processing unit; and servicing the interrupt or continuing with sequence of instructions if the interrupt is disabled.

5. A method of synchronizing hardware and software in a digital system having a central processing unit and at least one peripheral device, comprising:
 a. executing a sync instruction;
 b. waiting for an interrupt;
 c. receiving an interrupt and continuing with d, e, f, and g or continuing with the next instruction in a sequence of instructions thereby avoiding servicing the interrupt;
 d. getting data from an input port;
 e. storing the data and incrementing address;
 f. checking to determine whether all the data has been obtained from the input port; and
 g. repeating d, e, and f until all of the data has been obtained from the input port.

6. A method of synchronizing hardware and software in a digital system having a central processing unit, comprising: setting a latch in response to a synchronizing instruction which places the central processing unit in a stopped state; waiting for an interrupt to occur; resetting the latch in response to the interrupt; and continuing processing.

* * * * *